US006766254B1

(12) United States Patent
Bradford et al.

(10) Patent No.: US 6,766,254 B1
(45) Date of Patent: Jul. 20, 2004

(54) METHOD FOR UPDATING AN EARTH MODEL USING MEASUREMENTS GATHERED DURING BOREHOLE CONSTRUCTION

(75) Inventors: Ian Bradford, Cherry Hinton (GB); John Mervyn Cook, Cambridge (GB); John Fuller, Farnham (GB); Walter David Aldred, Houston, TX (US); Vidhyadhar Gholkar, Godalming (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 10/088,725

(22) PCT Filed: Sep. 27, 2000

(86) PCT No.: PCT/GB00/03704
§ 371 (c)(1),
(2), (4) Date: Aug. 5, 2002

(87) PCT Pub. No.: WO01/25823
PCT Pub. Date: Apr. 12, 2001

(30) Foreign Application Priority Data
Oct. 1, 1999 (GB) .......................................... 99232290

(51) Int. Cl.$^7$ ............................. G01V 1/40; G01V 1/00
(52) U.S. Cl. ............................................ 702/9; 367/73
(58) Field of Search ........................ 702/9, 16; 367/73; 703/10

(56) References Cited

U.S. PATENT DOCUMENTS

| 4,340,934 A | | 7/1982 | Segesman | |
|---|---|---|---|---|
| 4,695,957 A | | 9/1987 | Peltier | |
| 4,794,534 A | * | 12/1988 | Millheim | ....................... 702/9 |
| 5,838,634 A | | 11/1998 | Jones et al. | |
| 5,895,437 A | * | 4/1999 | Di Cesare et al. | ............... 702/9 |
| 5,995,446 A | | 11/1999 | Meyer et al. | |
| 6,256,603 B1 | * | 7/2001 | Celniker | ....................... 703/10 |
| 6,408,953 B1 | * | 6/2002 | Goldman et al. | ............. 175/39 |
| 6,549,854 B1 | * | 4/2003 | Malinverno et al. | .......... 702/16 |

FOREIGN PATENT DOCUMENTS

| EP | 0 527 089 A3 | 8/1992 |
|---|---|---|
| EP | 0 527 089 A2 | 8/1992 |
| WO | 97/27502 A | 7/1997 |

OTHER PUBLICATIONS

"Modeling of Yielded Zone Enlargement Around a Wellbore", Hawkes et al., Proceedings of the $2^{nd}$ North American Rock Mechanics Symposium, Jun. 19–21, 1996.*

(List continued on next page.)

*Primary Examiner*—John Barlow
*Assistant Examiner*—Toan M. Le
(74) *Attorney, Agent, or Firm*—William L. Wang; William B. Batzer; John J. Ryberg (57) ABSTRACT

A method and system for real time updating of an earth model. The efficiency with which an oil or gas well is constructed can be enhanced by updating the relevant earth model using real-time measurements of the effective density of the drilling fluid and other parameters. The method includes generating an earth model used for predicting potential problems in drilling of a borehole having a predetermined trajectory. Evaluations of the state of the borehole and local geological features are obtained which are based on the earth model. Real time data is used to create a diagnosis of the state of the borehole and local geological features. The evaluations are compared with a diagnosis to identify inconsistencies. A component of the earth model is identified that is both related to the identified inconsistency and has a high degree of uncertainty. The selected component of the earth model is then updated prior to completing construction of the borehole using the received data.

15 Claims, 11 Drawing Sheets

OTHER PUBLICATIONS

"Application of Probabilistic Techniques for Assessing Sand Production and Borehole Instability Risks", McLellan et al., Soc. of Petroleum Eng., SPE 47334, Jul. 1998.*

Addis, M.A., Hanssen, T.H., Yassir, N., Willoughby, D.R. and Enever, J.: 'A comparison of leak–off test and extended leak–off test data for stress estimation', paper SPE/ISRM 47235 presented at the 1998 Eurock Rock Mechanics in Petroleum Engineering Conference, Trondheim, Jul. 8–10.

Bradford, I.D.R., Fuller, J.A., Thompson, P.J., and Walsgrove, T.R.: 'Benefits of assessing the solids production risk in a North Sea reservoir using elastoplastic modelling', paper SPE/ISRM 47360 presented at the 1998 Eurock Rock Mechanics in Petroleum Engineering Conference, Trondheim, Jul. 8–10.

Fjaer, E., Holt, R.M., Horsrud, P., Raaen. A.M., and Risnes, R.: 'Petroleum Related Rock Mechanics', Elsevier, Amsterdam (1992), pp209–256.

Last et al "An integrated approach to evaluating and managing wellbore instability in the Cusiana field, Colombia, South America", paper SPE 30464, 1995 Annual SPE Technical Conference Dallas, Oct. 22–25.

Schlumberger Educational Services: 'Log interpretation principles/applications', Houston, Texas (1987), pp186–198.

Schlumberger Oilfield Review: 'Using Downhole Annular Pressure Measurements to Improve Drilling Performance', Sugar–Land, Texas, Winter 1998, pp40–55.

Pascal record 96–0292518.

Bourgoyne, A.T., Chenevert, M.E., Millheim, K.K. and Young, F.S.: Applied Drilling Engineering, SPE Textbook Series, vol. 2 (1991), pp113–191, pp220–245.

* cited by examiner

METHOD FOR UPDATING AN EARTH MODEL USING MEASUREMENTS GATHERED DURING BOREHOLE CONSTRUCTION

FIELD OF THE INVENTION

The present invention relates to the field of drilling oil and gas wells. In particular, the invention relates to a method for updating an earth model during construction of the well.

BACKGROUND OF THE INVENTION

Earth models contain data which characterise the properties of, and surfaces bounding, the geological features which form the earth's sub-surface, such as rock formations and faults. They are used to assist operations occurring in the earth's sub-surface, such as the drilling of an oil or gas well, or the development of a mine.

The domain of applicability of an earth model varies greatly and should be considered on a case by case basis. Some earth models are applicable only in the near vicinity of a particular oil or gas well, or mine. Others may be valid for an entire oil or gas field, or perhaps even over a region such as the North Sea or Gulf of Mexico.

The data in an earth model consists of measurements gathered during activities such as the seismic, logging or drilling operations of the oil and gas industry, and of interpretations made from these measurements. The data may be gathered above, on, or below the earth's surface.

As the duration or number of sub-surface operations increases, more data is gathered. This data can be used to amend the relevant earth model, with the aim that it should characterise the geology and properties ever more accurately. Clearly, it will be conducive to the efficiency of these operations if amendments which enhance the accuracy of the earth model are made as quickly as possible, or appropriate.

The oil and gas industry's traditional approach to amending earth models has not had a real-time element, apart from using formation integrity, leak-off or extended leak-off tests, or equivalent circulating density (ECD) data in the case of drilling fluid (commonly referred to as "mud") loss while drilling, to constrain the minimum principal in-situ stress. See e.g., Addis et al., 'A comparison of leak-off test and extended leak-off test data for stress estimation', paper SPE/ISRM 47235 presented at the 1998 Eurock Rock Mechanics in Petroleum Engineering Conference, Trondheim, Jul. 8–10 (hereinafter "Addis et al., 1998"). Measurement-while drilling (MWD) data, logging-while drilling (LWD) data, wireline logs, results from tests performed on core, drilling experience and perhaps other information are used to amend the relevant earth model using techniques identical to those used to generate the original version of the earth model. An example of these conventional techniques are described in a publication by Schlumberger Educational Services entitled 'Log interpretation principles/applications', Houston, Tex. (1987), incorporated herein by reference and hereinafter referred to as "(Schlumberger, 1987)".

This traditional approach has been enhanced in order to improve the handling of very severe wellbore instability problems in the Cusiana field in Colombia. See, Last, N., Plumb, R. A., Harkness, R., Charlez, P., Alsen, J. and McLean, M.: 'An integrated approach to evaluating and managing wellbore instability in the Cusiana field, Colombia, South America', paper SPE 30464 presented at the 1995 Annual SPE Technical Conference, Dallas Oct. 22–25, incorporated herein by reference and hereinafter "Last et al. (1995)." Last describes an integrated approach to evaluating and managing wellbore instability. An earth model was constructed using data from existing wells, together with results obtained using a computational analysis tool which modelled the geological structure and the in-situ stress state. This allowed the upper and lower bounds to the drilling fluid density to be estimated, provided that the well trajectory was specified, using standard techniques.

As a well was drilled, a data acquisition programme which included cavings monitoring and measurements-while-drilling allowed the failure mechanisms of the rock formations to be characterised and as well as the identification and implementation of appropriate drilling practices. This led to faster, more efficient, well construction. The earth model was updated after a well or hole section had been completed using all available data, particularly (a) downhole images of borehole geometry, fractures, faults and bedding (b) stress measurements such as extended leak-off tests (c) results from tests made on core, and (d) four arm calliper logs, where available. Measurement-while-drilling techniques were used to characterise time-dependent hole geometry in particular hole, intervals.

The approach of Last et al. (1995) enhanced the analysis of formation instability that can be made while drilling, with the minimum horizontal stress also being updated in real-time. The understanding of the nature of the formation instability led to improved drilling practices allowing the wells they studied to be constructed much more efficiently.

However, the approach of Last et al. (1995) has many limitations, including the following. First, no constitutive parameter or component of the in-situ stress state, other than the minimum principal stress, was updated in real-time. Such parameters were updated after drilling had been completed, using measurements made by wireline tools, in addition to the data gathered in real-time. Second, LWD measurements, such as resistivity and sonic, were not extensively used. This inhibited the diagnosis of the instability mechanisms. Due to these limitations, it was not possible to quantify amendments to drilling practices, apart from updating the value of ECD above which drilling fluid is lost to the formation.

SUMMARY OF THE INVENTION

Thus, it is an object of the present invention to provide a method to increase the efficiency with which an oil or gas well can be constructed.

It is a further object of the present invention to provide a method in which amendments that enhance the accuracy of the earth model are made quickly and efficiently.

It is a further object of the present invention where one or more inconsistencies are identified to provide a method of selecting which component or components of an earth model to update.

According to the present invention the efficiency with which an oil or gas well is constructed can be enhanced by updating the relevant earth model using real-time measurements of the effective density of the drilling fluid and at least one other parameter. Updating the earth model need not occur on a continuous basis, but on a timescale appropriate to this construction process. As used herein the term "real-time" is defined to mean as the well or borehole is being constructed. That is, the data acquisition can occur continuously (e.g. measurement while drilling data), or at discrete times (e.g. palaeontological analysis of rock carried by the drilling fluid from the wellbore) and still be considered "real-time".

A method for updating an earth model is provided that includes obtaining an earth model used for predicting potential problems in drilling of a borehole having a predetermined trajectory. Evaluations of the state of the borehole and local geological features are obtained which are based on the earth model. Data is received that has been gathered during the construction of the borehole. The evaluations are compared with a diagnosis of the state of the borehole and local geological features to identify at least one inconsistency. A component of the earth model is identified that is both related to the identified inconsistency and has a high degree of uncertainty. The selected component of the earth model is then updated prior to completing construction of the borehole using the received data.

Preferably, the evaluations of the state of the borehole and local geological features are predictions of one or more conditions under which the borehole will fail, and they are obtained by combining the earth model with the predetermined trajectory of the borehole.

Preferably, the process is repeated until a sufficient match exists between the predicted failure conditions and the diagnoses of the borehole.

Preferably, the earth model component that will be updated is selected by first identifying components of the earth model that are relevant to the identified inconsistency and then ranking the identified components according to the degree of uncertainty. The component selected is preferably updated using the minimum changes needed to eliminate an identified inconsistency.

Preferably, the received data includes the effective density of the drilling fluid used in the construction of the borehole and one at least other parameter, and the selected component is updated by using the effective density and at least one other parameter.

The invention is also embodied in a method for drilling a borehole using an earth model that is updated according to the invention. The invention is also embodied in a computer readable medium that is capable of causing a computer to update the earth model according to the invention.

DETAILED DESCRIPTION OF THE INVENTION:

The present invention advantageously increases efficiency with which an oil or gas well is constructed by updating the relevant earth model using real-time measurements. Preferably, the real-time measurements are ECD and at least one other parameter, which can gathered using common commercially available methods. For example, the ECD data may be obtained using such as Schlumberger's Annular Pressure While Drilling APWD measurements. See e.g., Schlumberger Oilfield Review: 'Using Downhole Annular Pressure Measurements to Improve Drilling Performance', Sugar-Land, Tex., Winter 1998 incorporated herein by reference and hereinafter referred to as "Schlumberger (1998)".

Figure 1:
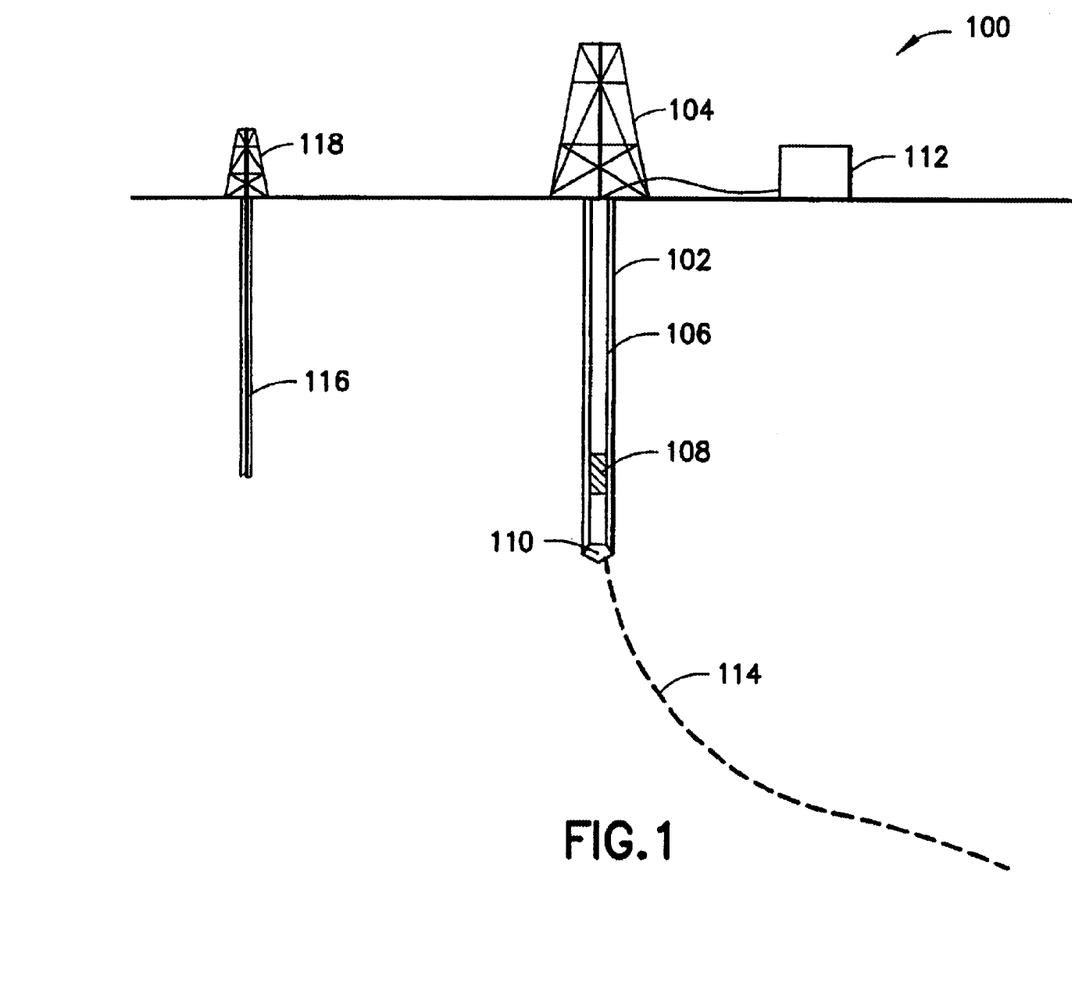
FIG. 1 illustrates the construction of a borehole according to a preferred embodiment of the invention.

FIG. 1 illustrates the construction of a borehole according to a preferred embodiment of the invention. Borehole 102 is being drilled into Earth 100. Rig 104 is located at the surface and is used to support the drilling operation Drill bit 110 is located at the bottom of the borehole and is connected to the rig via drill string 106. Also shown is a LWD or MWD tool 108 that is capable of making measurements during the drilling operation. The dashed line 114 shows the planned borehole trajectory. Offset well 116 is also shown, along with rig 118. Although in the example of FIG. 1 the boreholes are shown being drilled on land, the invention is also applicable to offshore drilling operations. Control station 112 is shown schematically, and contains one or more computers that are used to store the earth model, receive measurements from the downhole tools, and update the earth model according to the preferred embodiments described herein. The control station 112 is shown to be located near the rig 104, however in general the control station can be located remotely. Alternatively, some portions of the control station could be located remotely while other portions are located near to the borehole.

Figure 2:
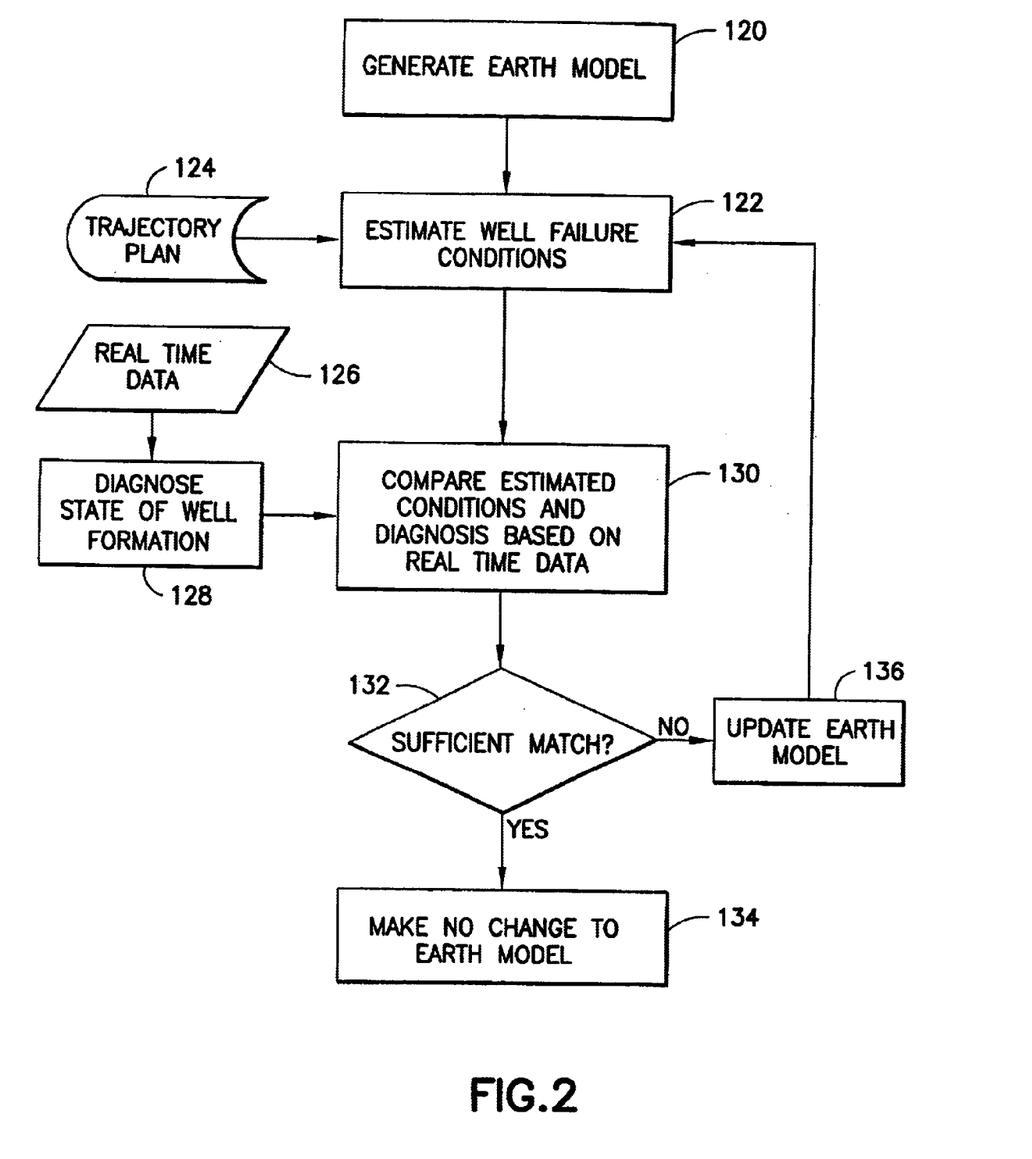
FIG. 2 shows a flow chart of a method of updating an earth model, according to a preferred embodiment of the invention.

FIG. 2 shows a flow chart of a method of updating an earth model, according to a preferred embodiment of the invention. In step 120, prior to drilling a well and applying the invention, an earth model is generated with seismic, logging and offset well data using techniques which are publicly documented (See, e.g., Last et al. (1995), Schlumberger, 1987). The data contained in the earth model is defined herein as the "components" of the earth model. The types of data or components contained in an earth model typically consists of: (1) Surfaces bounding geological features, (2) Constitutive parameters of the rock. These describe the mechanical response of rock under load, (3) Stress state and pore pressure, (4) Nature and severity of the drilling hazards associated with each geological feature and/or trajectory. The drilling hazards are categorised from a list which includes hole cleaning, sloughing, chemical activity, undergauge hole, interbedded sequences. faults, naturally fractured formations, formations with weak planes, mobile formations and permeable formations (this list is not exhaustive and further categories can be envisaged), and (5) Any other parameter that may prove to be useful for real-time analysis, such as gamma-ray measurements which characterise the radioactive nature of a formation.

In step 122, the earth model is combined with the planned well trajectory 124, in order to estimate the upper and lower bounds to the drilling fluid density, together with the drilling hazards and their severity at discrete points along the trajectory. Step 122 may be accomplished using standard techniques, such as those outlined in Fjaer, E., Holt, R. M., Horsrud, P., Raaen. A. M., and Risnes, R.: 'Petroleum Related Rock Mechanics', Elsevier, Amsterdam (1992), incorporated herein by reference and hereinafter referred to as "Fjaer et al. (1992)." More sophisticated analyses could also be used which may involve concepts such as elasto-plastic modelling. See e.g. Bradford, I. D. R., Fuller, J. A., Thompson, P. J., and Walsgrove. T. R.: 'Benefits of assessing the solids production risk in a North Sea reservoir using elastoplastic modelling', paper SPE/ISRM 47360 presented at the 1998 Eurock Rock Mechanics in Petroleum Engineering Conference, Trondheim, July 8–10 Incorporated herein by reference and hereinafter referred to as "Bradford et al., (1998)." Although the earth model is shown to be generated in step 120 and the estimations performed in step 122, the earth model and the estimates could be obtained through other means such as receiving them from an outside service provider.

As the well is being drilled, the nature and severity of instability mechanisms, together with the conditions under which they occur, are identified, or diagnosed, in step 128. The extent of any instability, which is defined as the length of wellbore over which formation failure is occurring, may also determined. The diagnosis of step 128 can be carried out by the method disclosed in Last et al. (1995). However, a more extensive use of real-time MWD and LWD measurements is preferably used for the diagnosis.

According to a preferred embodiment, in step 128, diagnosing the nature, severity and extent of wellbore instability mechanisms should include the following considerations.

1. There should be sufficient familiarity, prior to commencing operations, with the upper and lower bounds of the drilling fluid density (these define the "mud window") and the anticipated severity of any instabilities.

2. The mud density and ECD should be monitored continuously, particularly in relation to the mud window calculations in order to assess the likely degree of breakouts and the possibility of mud losses. When the mud is stationary, as is the case during connections, the ECD equals the mud density. During drilling, or while circulating off bottom, the ECD typically exceeds the mud density by up to 0.5–1.0 lb/gal. During trips, when equipment is being pulled up and down the well, the ECD below the bit is typically 0–0.5 lb/gal less and more, respectively, than the mud density.

3. The behaviour of the drillpipe and bottom hole assembly (BHA), hole cleaning, rate of penetration (ROP), trajectory, cavings rate and morphology, mud losses/gains and chemistry, together with resistivity, gamma-ray, compressional slowness and caliper LWD measurements should also be continuously monitored. It is then possible to conduct the following evaluations:

(a) Cavings analysis can provide a signal that the borehole is failing and indicates the troublesome formations. Tabular, angular or splintered cavings indicate that the nature of the instability is natural fracturing or weak planes, breakouts and over-pressure. respectively. The cavings rate indicates the level of failure. However, if the hole cleaning is inadequate, not all of the debris generated by any instability may be discharged from the well, thereby masking the severity of the problem. This issue is discussed fully below.

(b) Mud losses occur in naturally fractured zones faults or drilling induced fractures. Such an event indicates that the fluid pressure in the annulus has exceeded the minimum in-situ principal stress. Mud gains indicate the pore pressure has exceeded the mud pressure or that previously lost mud is being returned to tile wellbore due to fracture closure. Such an event allows the pore pressure estimate to be refined. In areas where there is chemical instability, a more comprehensive mud analysis programme may be required.

(c) Gamma-ray data enables formation boundaries to be identified. Some characterisation of the formation may also be possible, if the data is combined with other measurements such as resistivity.

(d) Resistivity measurements allows fracture identification. Schlumberger's LWD tool measures the resistivity at various depths (See e.g., Schlumberger (1998)); the degree of oil based mud invasion into water filled fractures can therefore be determined.

(e) Compressional slowness characterises pore pressure and formation strength.

(f) Caliper measurements of hole enlargement, if available, will identify the unstable formations.

(g) The ROP and hole cleaning efficiency form the key links between wellbore instability and operations. Rock debris in the annulus, resulting from drilling and/or wall failure, will increase if hole cleaning is inadequate, raising the risk of pack-offs, stuck pipe and tools lost in hole. For and explanation of these terms, see Bourgoyne, A. T., Chenevert, M. E., Millheim, K. K. and Young, F. S. : 'Applied Drilling Engineering, SPE Textbook Series', Vol. 2 (1991) incorporated herein by reference. The ability to clean the hole is also related to the ROP. At sufficiently high ROP's, the rate of influx of debris into the annulus, from drilling and newly exposed rock which may be failing, will exceed the rate at which material can be discharged from the well, leading to the consequences outlined above.

A reliable diagnosis of the instability mechanism preferably uses all available data. If tabular cavings, due to natural fracturing, are observed, then the resistivity log should be checked for evidence of mud invasion into fractures and the mud records require examining for losses. Similarly, if splintered cavings due to over-pressured formations are seen then high gas levels, kicks or mud gains may also be present. The observation of angular cavings due to breakouts requires the debris levels in the hole to be discerned. In all cases, the cavings volume should be compared to the ECD and the degrees of tight hole and restricted circulation to discern the effectiveness of the hole cleaning and the severity of instability.

In step 130, the states of the wellbore, and geological features adjacent to it, that are predicted using the earth model are compared with those diagnosed using real-time data. If differences exist between the predicted and diagnosed states then the earth model is updated. The comparison of the estimated conditions and the real time based diagnosis should be considered to "match" when the two conditions are within a reasonable range, For example, according to a preferred embodiment, if the mud pressure at which moderately severe breakouts occurred is not within 2 percent of the value estimated in step 122, then they considered inconsistent and a "sufficient match" in step 132 does not exist. However, the individual thresholds for each compared condition will have to be determined on a case-by-case basis.

According to a preferred embodiment, real-time data 126 includes measurements of the ECD and at least one other parameter. Preferably, these measurements are used in the comparison of diagnosed states with predictions derived from the earth model in step 130, and in the updating of the earth model, which discussed more fully below.

Figure 3A:
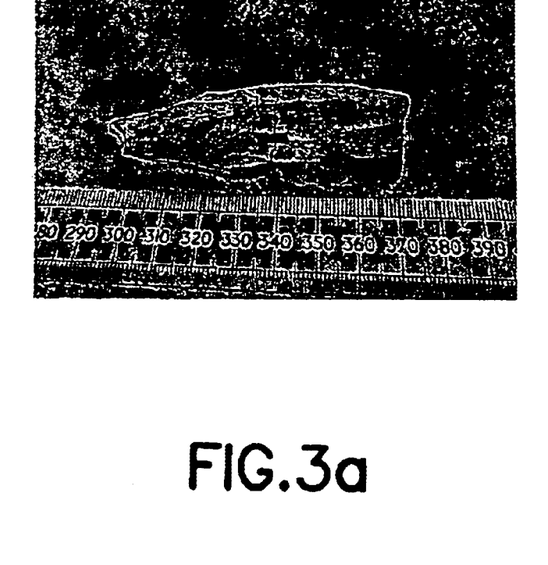
FIGS. 3a and 3b show examples of angular cavings that have become detached from the wellbore wall when breakouts occur.
Figure 3B:
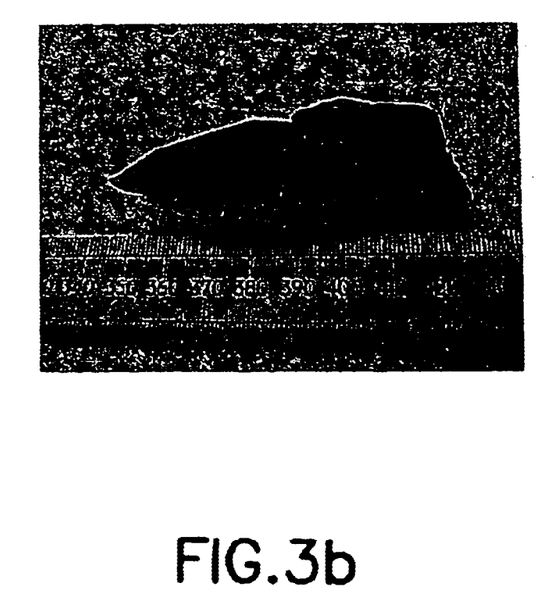
Figure 4:
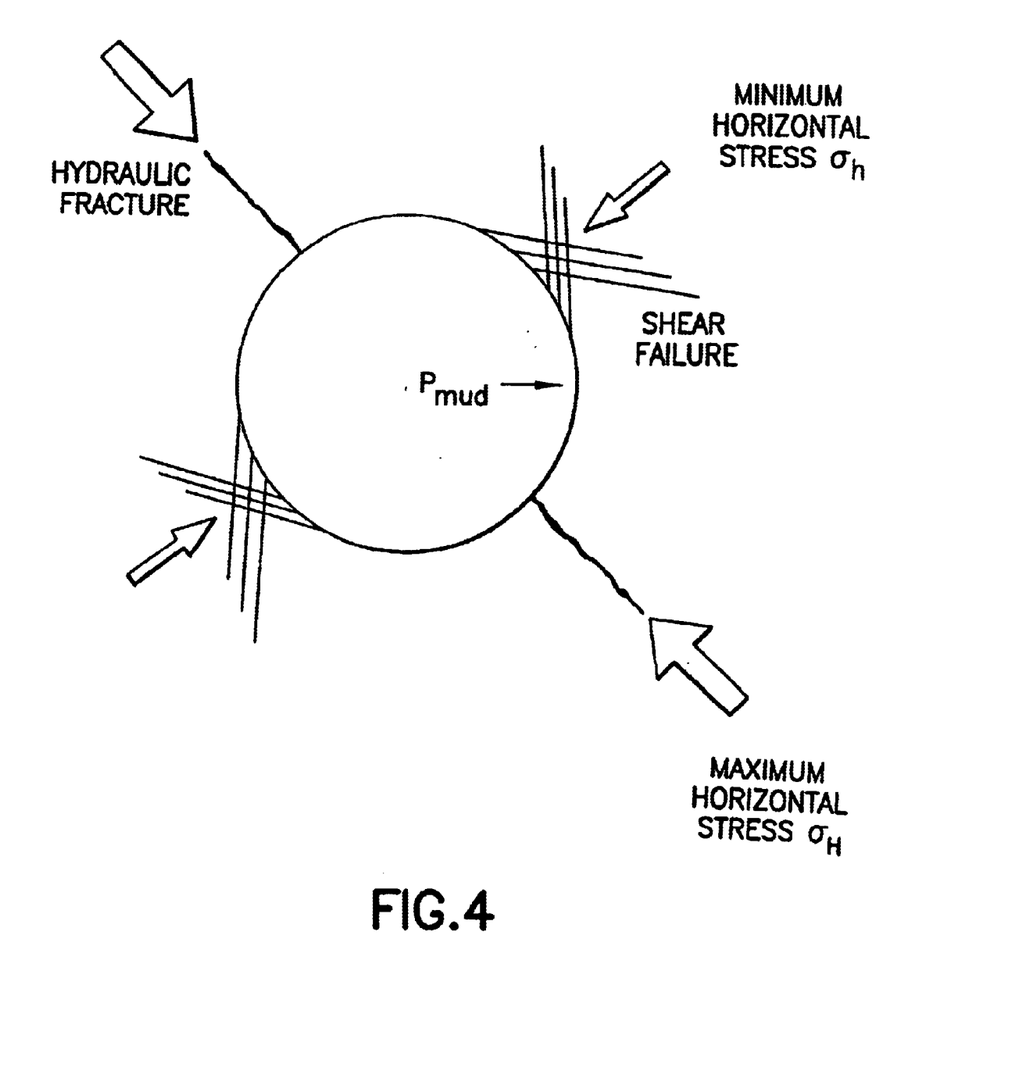
FIG. 4 is a schematic representation of breakouts and drilling induced fractures in a vertical well embedded in an isotropic rock formation.

For example, in a vertical well, suppose the ECD exceeds the estimated lower bound of the drilling fluid density and that a steady stream of cavings is being carried from the hole. If the cavings have an angular morphology, then breakouts have occurred, albeit at a higher than expected drilling fluid pressure, as indicated by the ECD data. As the pressure of the drilling fluid decreases, zones of shear failure develop that are centred about the line of action of the minimum horizontal, in-situ stress. The material in these zones eventually drops into the wellbore, leading to the cavings shown in FIGS. 3a and 3b. Conversely, as the drilling fluid pressure increases, fractures develop centred about the line of action of the maximum horizontal in-situ stress.

According to a preferred embodiment, following are four examples of situations in which there would be an insufficient match in step 132 and the earth model would therefore be updated:

1. Breakouts occur, or the fluid is lost to the formation, at values of ECD that differ from those that are predicted;

2. The nature, severity or extent of the drilling hazards differ from their prognosis;

3. Geological characteristics (e.g. the location of formation tops with respect to the trajectory) differ from their prognoses; or 4. Fluid or gas unexpectedly enters the wellbore indicating that estimates of the pore pressure are inaccurate.

Referring again to FIG. 2, in this example a sufficient match would not exist in step 132. Accordingly, the earth model would be updated in step 136. In this example, the in-situ stress state, the formation strength, or both of these quantities should be amended so that the predicted and actual states match adequately.

Figure 5:
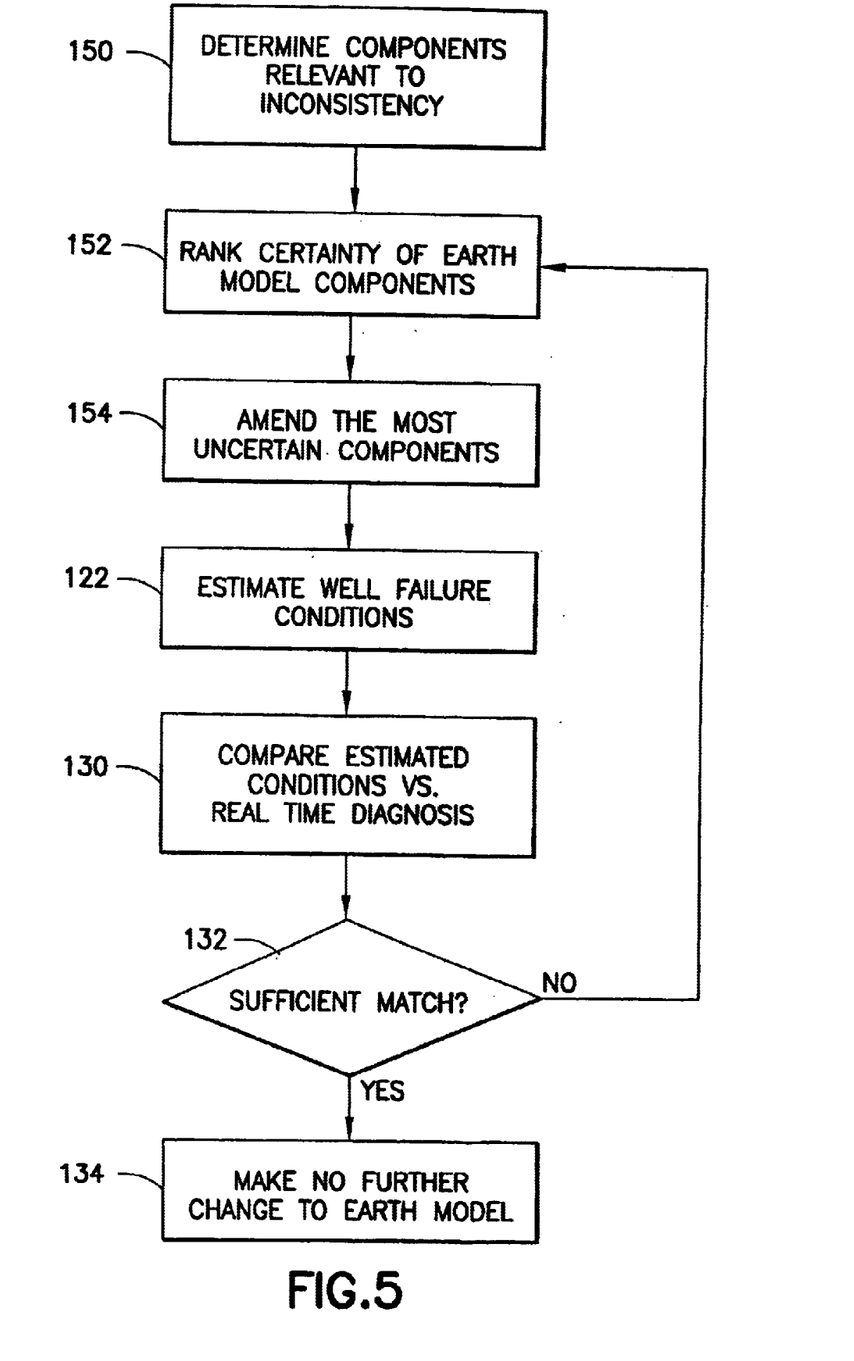
FIG. 5 is a flow chart illustrating in greater detail the preferred method of updating the earth model according to the present invention.

According to a preferred embodiment, the components of the earth model that are the most uncertain should be given priority in the updating process. This advantageously allows for the most efficient and accurate updating of the earth model. FIG. 5 is a flow chart illustrating in greater detail the preferred method of updating the earth model according to the present invention. Steps 150, 152 and 154 correspond to step 136 in FIG. 2, whereas steps 122, 130, 132 and 134 correspond to the same steps in both FIGS. 2 and 5.

In step 150 the components that are relevant to the inconsistency are determined. In cases where there are more than one inconsistency is identified in the comparison step 130, the most hazardous inconsistency is generally addressed first. In step 152 the relevant components identified in step 150 are ranked according to certainty. In other words, the earth model components that are most unreliable are identified, and preferably, ranked in order of reliability. Alternatively, step 150 can be skipped and the ranking step 152 applied to all or some predetermined number of most uncertain components. The goal of steps 150 and 152 are to identify the most unreliable or most uncertain components or parameters in the earth model so that the update can be focused on those components.

In step 154 the most uncertain components are updated. According to a preferred embodiment, the components that are updated are ideally altered by the smallest degree needed to allow matching of the predicted and measured components.

As discussed above, in steps 122, 130, 132, and 134 failure conditions are estimated, and comparison is made to determine if there is a sufficient match between the estimated conditions and the real time diagnosis. If there is a sufficient match, no further changes are made to the earth model. When a sufficient match is not found, steps 152, 154 122, 130 and 132 are repeated as shown in FIG. 5. When step 152 is being repeated, the recently amended components are preferably re-ranked as being more certain due do their recent amendment. When step 122 is being repeated, the well failure conditions are re-estimated using the updated components.

Following is an example the process described in FIG. 5. If real-time compressional slowness data is available through use of the appropriate LWD tool, then the formation strength estimate can be inferred from this measurement and the formation strength is assumed to be the most reliable component in step 154. In step 154, the minimum change to the in-situ stress state (actually the maximum principal in-situ stress, as the minimum principal in-situ stress is constrained using a combination of fluid loss and ECD data) should then be made which allows the predicted and measured pressures at which breakouts occur to adequately match, with the latter determined using ECD data. If real-time compressional slowness data is not available, then it is assumed that the formation strength is the most unreliable (or least certain) parameter or component in step 152 In step 154, the formation strength is updated until prediction and reality match adequately.

Following are further examples of how the earth model updating processes in steps 150, 152 and 154 could be carried out, according to the invention. In particular, if breakouts or fluid losses do not occur as anticipated then the in-situ stress state and formation strength predictions should be amended. More specific examples are as follows.

Suppose the ECD exceeds the anticipated minimum principal in-situ stress without fluid loss. The minimum principal in-situ stress should be amended to be equal to the maximum ECD encountered over the appropriate interval. The new estimate of the minimum principal in-situ stress will be a lower bound to the true value, but will be more accurate than the existing prediction.

Suppose fluid loss occurs at an ECD lower than the minimum principal in-situ stress. The minimum principal in-situ stress should be set to the ECD at which the fluid loss occurred. This will require a comparison of the time based ECD and drilling fluid volume logs.

Suppose breakouts occur at a value of the ECD higher than the minimum value predicted; it is then either in-situ stress state, the formation strength, or both of these quantities that should be amended. If the formation strength can be inferred from real-time measurements, such as compressional slowness data from the appropriate LWD tool or indentation tests on cuttings, then it may be assumed to be the most reliable parameter. The minimum change to the in-situ stress state (actually the maximum principal in-situ stress, as the minimum principal in-situ stress is constrained through fluid loss observations) is then made which allows prediction to match reality. If the formation strength cannot be inferred from real-time measurements, it should be assumed to be the most unreliable parameter and then amended until there is an adequate match between prediction and reality. The method of updating the in-situ stress or formation strength is identical in both cases: it requires that these parameters are amended until the output of the models that has used to estimate the bounds to the drilling fluid density agrees with the real-time measurement. This is an iterative process.

Breakouts occurring at values of ECD that are lower then the predicted minimum values are expected. No change is therefore made to the mechanical earth model.

Suppose the nature, severity or extent of the drilling hazards, or geological characteristics, differ from their prognoses, or fluid or gas unexpectedly enters the wellbore. The diagnostic techniques outlined in above could be used to detect these events and the earth model could then be directly updated without further computation, although the ECD should be used to assess the severity of the drilling hazard and the expectation of fluid or gas entry into the wellbore. Other real-time information, such as palaeontological analysis of cavings or LWD resistivity data, should be used to assess the extent of any instability associated with the wellbore or adjacent geology.

Figure 6:
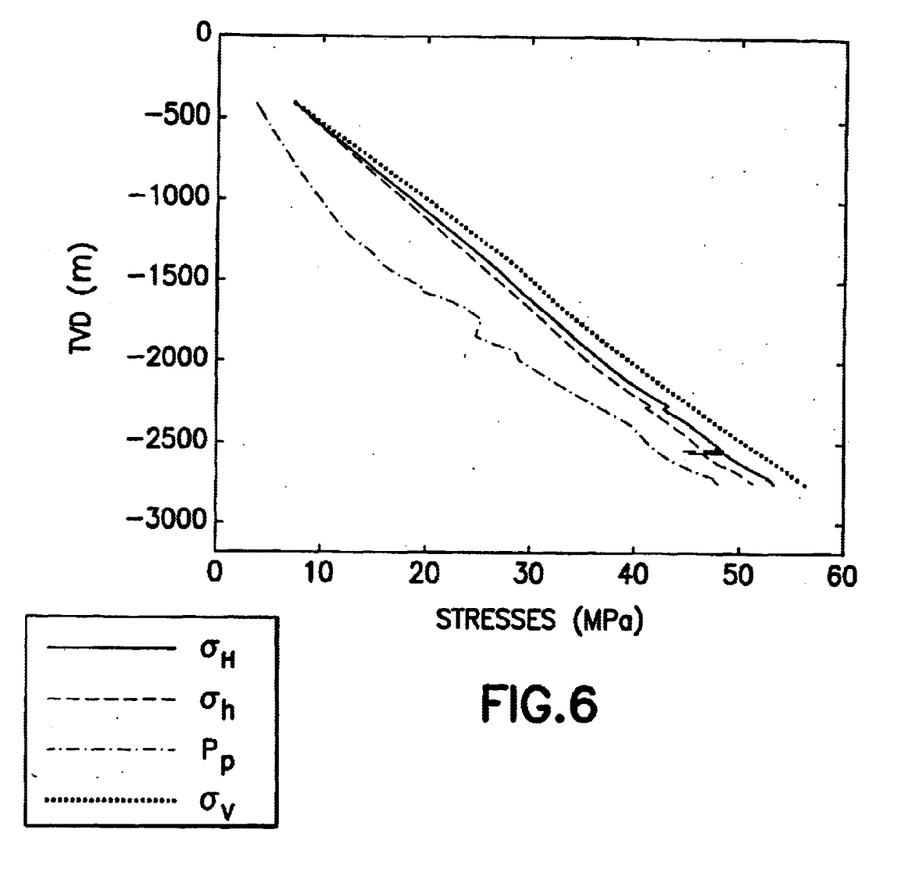
FIG. 6 illustrates an example of the minimum principal in-situ stress in an earth model.

The following example further illustrates how an earth model may be updated. After a well had been drilled to a depth of 2000 m TVD (true vertical depth), it was decided to pull the drilling equipment out of the well. However, during this process 12 barrels of drilling fluid were lost to the formation. The real-time ECD measurement showed that this occurred at a pressure equivalent to 15.35 lb/gal. FIG. 6 illustrates an example of the minimum principal in-situ stress in an earth model, according to a preferred embodiment of the invention. As shown in FIG. 6, the minimum principal in-situ stress was therefore revised to be the equivalent of 15.35 lb/gal for the entire region above 2000 m TVD.

Figure 7:
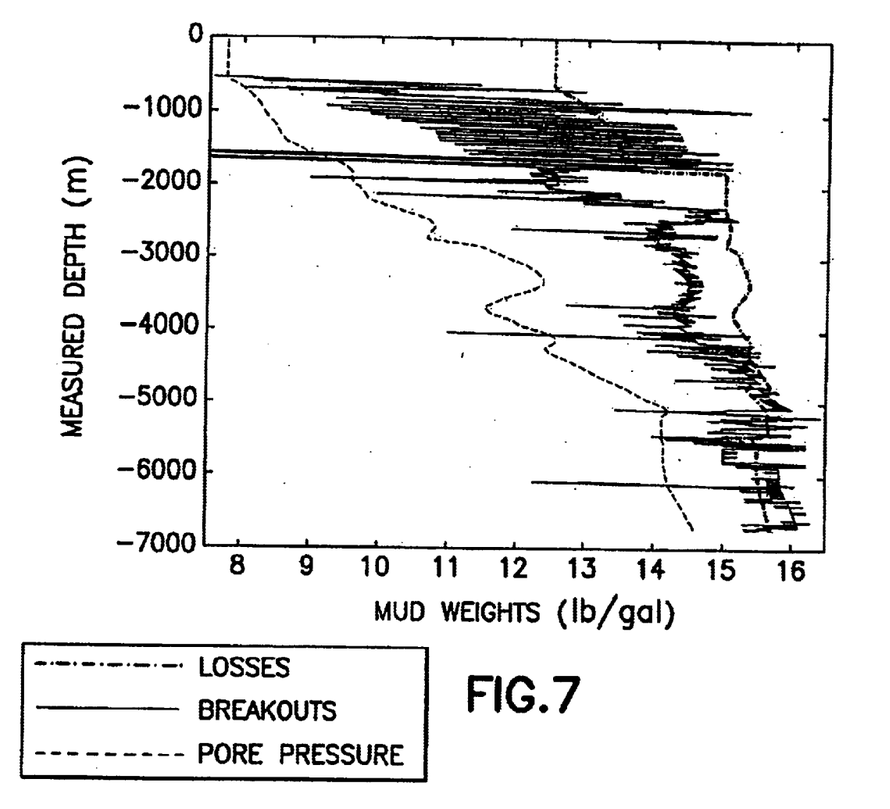
FIG. 7 illustrates an example of the mud window estimated prior to drilling a well.
Figure 8:
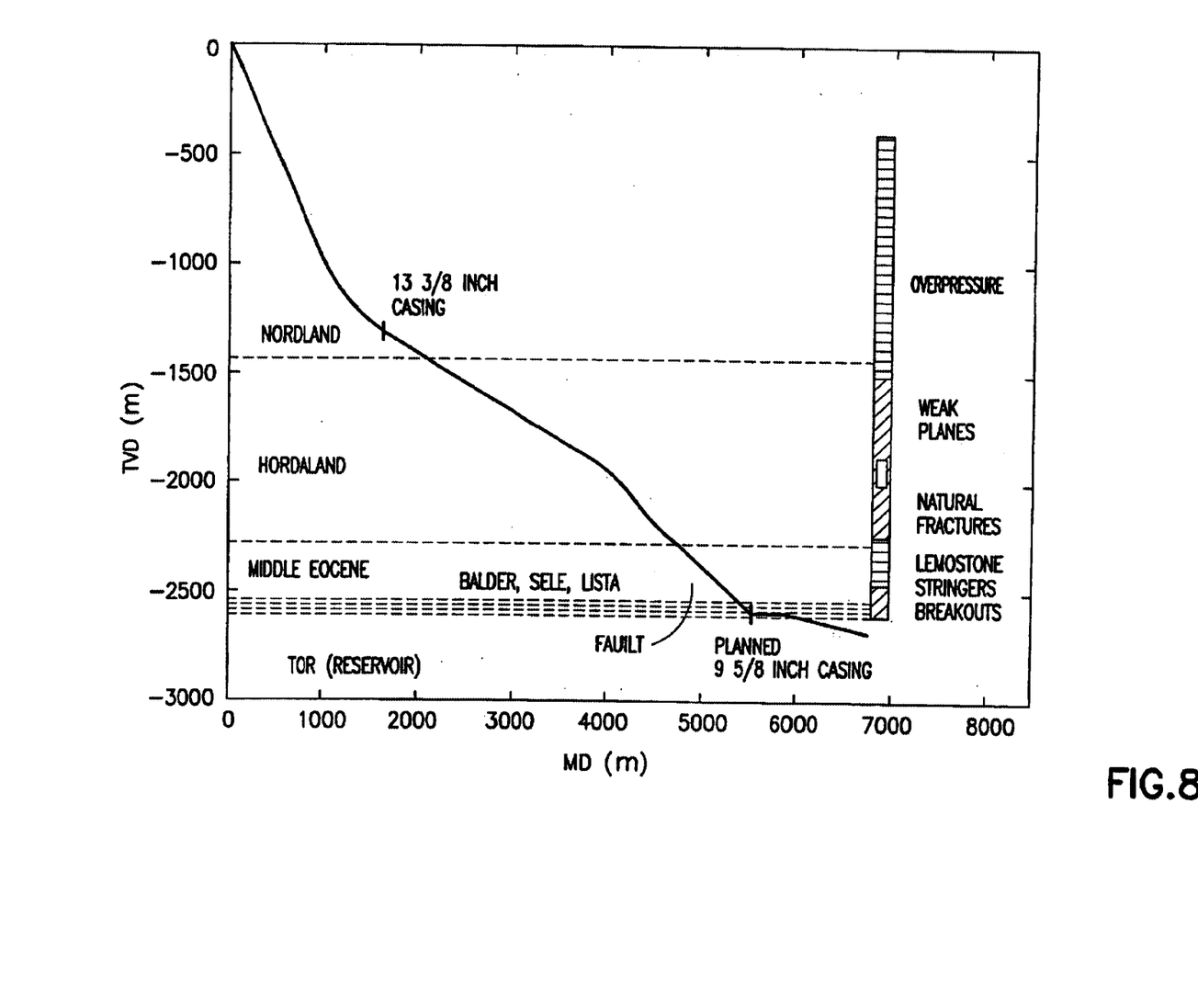
FIG. 8 illustrates an example of drilling hazards derived from an analysis of experience drilling offset wells and the well trajectory shown in FIG. 9.
Figure 9:
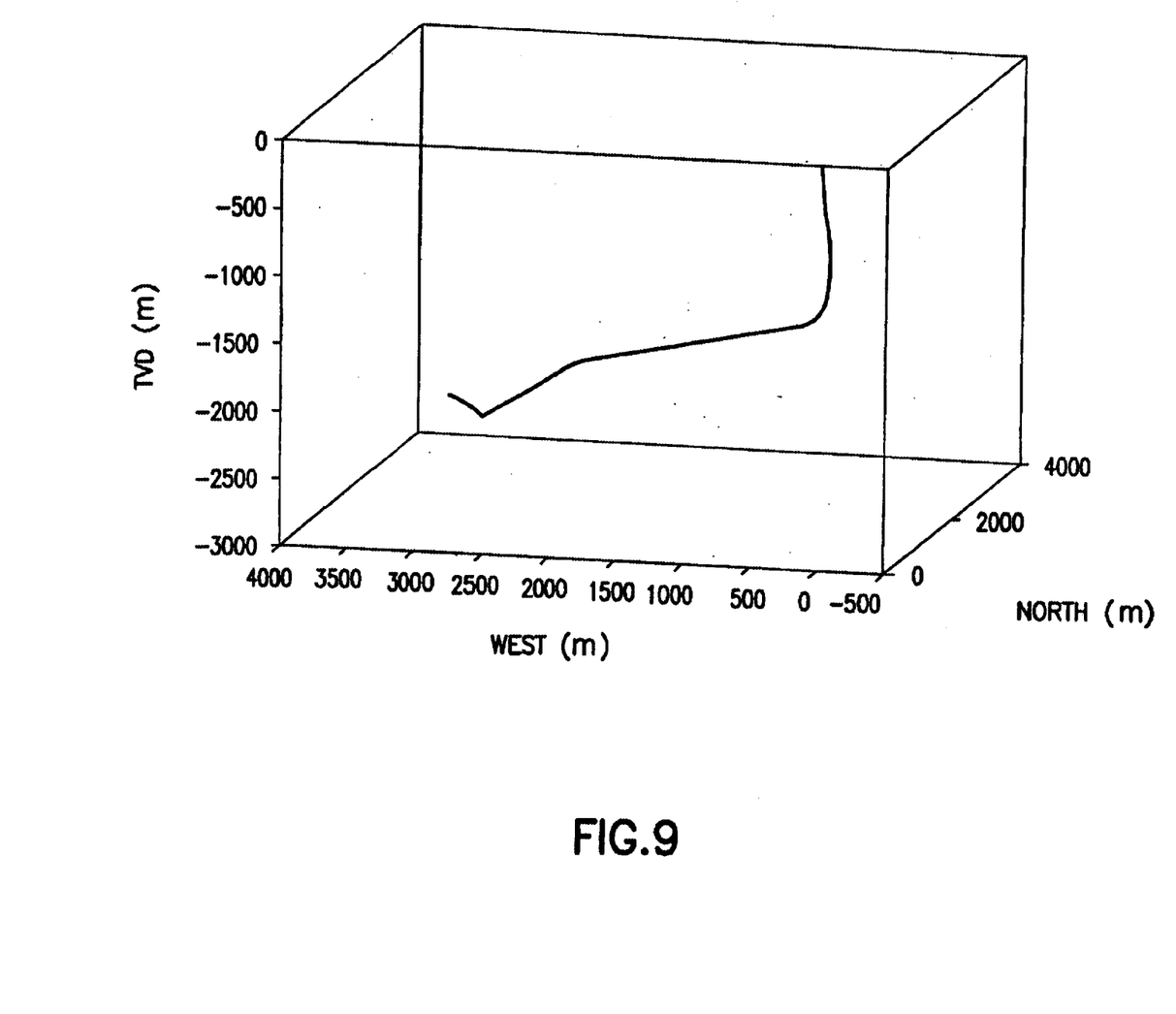
FIG. 9 illustrates the trajectory of the well used in the examples of FIGS. 6–11.
Figure 10:
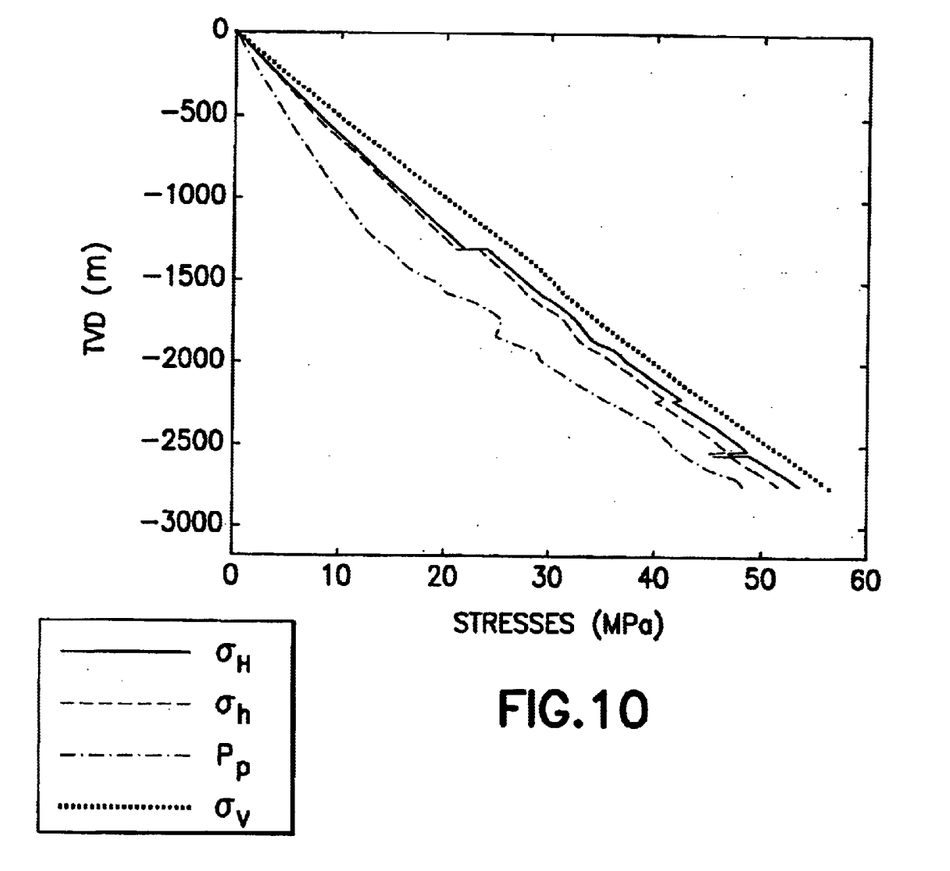
FIG. 10 illustrates the in-situ stress state prior to drilling the well used in FIGS. 6–11.
Figure 11:
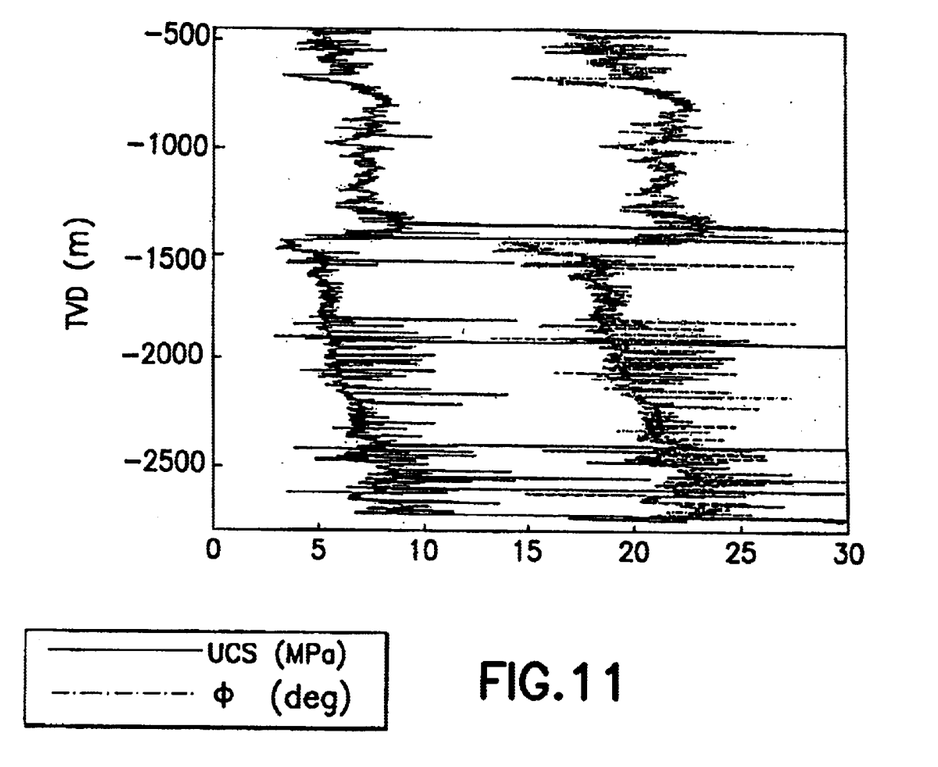
FIG. 11 illustrates an example of the formation strength in the example of FIGS. 6–11.

As discussed, estimates along the trajectory of the upper and lower bounds of the drilling fluid density, together with the nature, severity and extent of the drilling hazards, allow the states of the wellbore, and geological features adjacent to it, to be predicted while the well is constructed. Examples of these are shown in FIGS. 7 and 8 for a well drilled in the North Sea. FIG. 7 illustrates an example of the mud window (i.e. allowable drilling fluid densities) estimated prior to drilling the well. Drilling with a mud (i.e. fluid) whose density falls to the left of the solid line leads to breakouts. Conversely, drilling with a mud whose density falls to the right of the thick broken line will cause fluid loss into the formation. The vertical axis denotes the length of wellbore below the drilling rig floor. FIG. 8 illustrates an example of drilling hazards, derived from an analysis of experience drilling offset wells, and the well trajectory shown in FIG. 9. In FIG. 8, the severity of the hazard is shown as a "traffic light" classification. The vertical cross hatch indicates that the symptoms of the instability are present but insignificant: no remedial action is necessary. The horizontal cross hatch indicates that remedial action should be taken because the instability is significant and could become serious. The diagonal cross hatch indicates that the instability is likely to result in loss of the well. The problem should be avoided, otherwise immediate remedial action should be taken. FIG. 9 illustrates the trajectory of the well used in the examples of FIGS. 6–11. The Northerly and westerly directions are annotated (N and W, respectively). The vertical scale is true vertical depth below the drilling rig floor. FIG. 10 illustrates the in-situ stress state prior to drilling the well used in FIGS. 6–11. In FIG. 10, the symbols $\sigma_V$, $\sigma_h$ and $\sigma_H$ denote the vertical, minimum horizontal, maximum horizontal stresses, respectively and $P_P$ is the pore pressure. TVD denotes true vertical depth with respect to the drilling rig floor. FIG. 11 illustrates an example of the formation strength in the example of FIGS. 6–11. The formation strength shown in FIG. 11 is defined by the two parameters required to define the Mohr-Coulomb failure criterion. UCS and $\phi$ denote the uniaxial compressive strength and friction angle respectively.

The upper and lower bounds to the drilling fluid density may be derived by combining a prediction of the stress state around the wellbore embedded in an isotropic, homogeneous medium using an undrained linear elastic model with a Mohr-Coulomb failure criterion (Fjaer et al., 1992), or through use of other techniques. The lower bound represents the minimum ECD that is required in order to prevent breakouts. The upper limit represents the maximum ECD that is allowable before rock at the wellbore wall fractures or fluid is lost to the formation. These bounds may, however, have different physical interpretations if more sophisticated models (for example, the deformation of a salt formation) are used to derive them.

While preferred embodiments of the invention have been described, the descriptions and examples are merely illustrative and are not intended to limit the present invention.

What is claimed is:

1. A method for updating an earth model comprising the steps of:
    obtaining an earth model used for predicting potential problems in drilling of a borehole having a predetermined trajectory, the earth model comprising a plurality of components;
    predicting one or more conditions under which the borehole will fail based on the earth model;
    receiving data gathered during the construction of the borehole;
    comparing the predicted failure conditions with a diagnosis of the borehole to identify at least one inconsistency, the diagnosis being based on the received data;
    selecting a component of the earth model that is related to the identified inconsistency and has a high degree of uncertainty; and
    updating the selected component of the earth model prior to completing construction of the borehole using the received data.

2. The method of claim 1 wherein the predictions are obtained by combining the earth model with the predetermined trajectory of the borehole.

3. The method of claim 2 further comprising repeating the steps of predicting, comparing, selecting and updating until a sufficient match exists between the predicted failure conditions and the diagnoses of the borehole.

4. The method of claim 3 wherein the step of predicting when repeated uses the updated component of the earth model, and the step of selecting when being repeated, considers components that have been recently updated as having a lower degree of uncertainty.

5. The method of claim 1 wherein the step of selecting a component comprises:
    identifying components of the earth model that are relevant to the identified inconsistency; and
    ranking the identified components according to the degree of uncertainty.

6. The method of claim 1 wherein the selected component is the component having the highest degree of uncertainty of the components that are related to the identified inconsistency.

7. The method of claim 1 wherein the step of updating comprises effecting the minimum practical changes to the selected component that eliminates an identified inconsistency.

8. The method of claim 1 wherein the received data includes the effective density of the drilling fluid used in the construction of the borehole and one at least other parameter, and the step of updating comprises updating the selected component using the effective density and the at least one other parameter.

9. The method of claim 1 wherein the diagnosis of the borehole is generated by extensive use of real-time MWD and LWD measurements.

10. The method of claim 1 wherein the stop of obtaining an earth model includes generating the earth model.

11. A computer readable medium that is capable of causing a computer to perform steps comprising:

obtaining an earth model used for predicting potential problems in drlling of a borehole having a predetermined trajectory, the earth model comprising a number of components;

predicting one or more conditions under which the borehole will fail based on the earth model;

receiving data gathered during the construction of the borehole;

comparing the predicted failure conditions with a diagnosis of the borehole to identify at least one inconsistency, the diagnosis being based on the received data;

selecting a component of the earth model that is related to the identified inconsistency and has a high degree of uncertainty; and updating the selected component of the earth model prior to completing construction of the borehole using the received data.

12. The computer readable medium of claim 11 capable of causing a computer to perform steps further comprising:

identifying components of the earth model that are relevant to the identified inconsistency; and ranking the identified components according to the degree of uncertainty.

13. The computer readable medium of claim 12 wherein the step of updating comprises effecting the minimum practical changes to the selected component that eliminates an identified inconsistency.

14. The computer readable medium of claim 13 wherein the received data includes the effective density of the drilling fluid used in the construction of the borehole and one at least other parameter, and the step of updating comprises updating the selected component using the effective density and the at least one other parameter.

15. The method of claim 1 further comprising the step of thereafter drilling a portion of the borehole using the earth model including the updated component.

* * * * *